United States Patent
Kramer et al.

(10) Patent No.: US 11,138,626 B2
(45) Date of Patent: *Oct. 5, 2021

(54) SYSTEM FOR MARKETING CAMPAIGN SPECIFICATION AND SECURE DIGITAL COUPON REDEMPTION

(71) Applicant: Groupon, Inc., Chicago, IL (US)

(72) Inventors: James F. Kramer, Foster City, CA (US); Paul C. Ning, Foster City, CA (US)

(73) Assignee: GROUPON, INC., Chicago, IL (US)

( * ) Notice: Subject to any disclaimer, the term of this patent is extended or adjusted under 35 U.S.C. 154(b) by 229 days.

This patent is subject to a terminal disclaimer.

(21) Appl. No.: 16/151,503

(22) Filed: Oct. 4, 2018

(65) Prior Publication Data
US 2019/0205913 A1    Jul. 4, 2019

Related U.S. Application Data

(63) Continuation of application No. 14/052,542, filed on Oct. 11, 2013, now Pat. No. 10,096,039, which is a
(Continued)

(51) Int. Cl.
| | | |
|---|---|---|
| G06Q 30/02 | (2012.01) | |
| G06Q 30/06 | (2012.01) | |
| G06Q 10/10 | (2012.01) | |
| G06Q 50/00 | (2012.01) | |

(52) U.S. Cl.
CPC ......... *G06Q 30/0225* (2013.01); *G06Q 30/02* (2013.01); *G06Q 30/0224* (2013.01);
(Continued)

(58) Field of Classification Search
CPC ............... G06Q 30/02; G06Q 30/0224; G06Q 30/0225; G06Q 30/0261; G06Q 30/0267; G06Q 30/0281; G06Q 50/01
(Continued)

(56) References Cited

U.S. PATENT DOCUMENTS

| | | |
|---|---|---|
| 5,209,323 A | 5/1993 | Hopkins |
| 5,471,593 A | 11/1995 | Branigin |
| (Continued) | | |

FOREIGN PATENT DOCUMENTS

| | | |
|---|---|---|
| WO | WO 2002/001405 | 1/2002 |
| WO | WO 07/090133 | 6/2013 |

OTHER PUBLICATIONS

"LBS Startups to Watch: A slew of location-based services startups are hoping to make serendipity a little more regular," Red Herring Magazine, Oct. 17, 2005, 5 pages.
(Continued)

*Primary Examiner* — Jonathan P Ouellette
(74) *Attorney, Agent, or Firm* — Alston & Bird LLP

(57) ABSTRACT

Product vendors are provided with a system for performing a marketing campaign to mobile communication device users, providing offers as instruments, such as digital coupons, to a selected group of users of the mobile communication devices and validating the integrity of the instruments. The invention has two phases: the selection of the components of the instrument from a menu provided by a social networking organization; and validating the instrument upon redemption from the product vendor. In the first phase, the product vendor selects elements from the menu relevant to the campaign, such as timing, nature of the offer, targeting of the recipients, etc. In the second phase, the instrument is encoded as to the marketing campaign and an arbitrary designation which initiates a pattern as the instrument is redeemed. The product vendor inspects the instrument to ensure that the encoding is correct during the redemption process.

18 Claims, 1 Drawing Sheet

Related U.S. Application Data continuation of application No. 13/329,307, filed on Dec. 18, 2011, now Pat. No. 8,583,447, which is a continuation of application No. 12/182,592, filed on Jul. 30, 2008, now Pat. No. 8,103,519, which is a continuation-in-part of application No. 12/161,554, filed as application No. PCT/US2007/061328 on Jan. 30, 2007, now Pat. No. 7,856,360, which is a continuation-in-part of application No. 11/307,262, filed on Jan. 30, 2006, now Pat. No. 7,788,188.

(60) Provisional application No. 60/823,573, filed on Aug. 25, 2006.

(52) U.S. Cl.
CPC ..... *G06Q 30/0261* (2013.01); *G06Q 30/0267* (2013.01); *G06Q 30/0281* (2013.01); *G06Q 50/01* (2013.01)

(58) Field of Classification Search
USPC .................................. 705/1.1–912
See application file for complete search history.

(56) References Cited

U.S. PATENT DOCUMENTS

| | | |
|---|---|---|
| 5,697,844 A | 12/1997 | Von Kohorn |
| 6,259,405 B1 | 7/2001 | Stewart et al. |
| 6,414,635 B1 | 7/2002 | Stewart et al. |
| 6,480,885 B1 | 11/2002 | Olivier |
| 6,549,768 B1 | 4/2003 | Fraccaroli |
| 6,571,279 B1* | 5/2003 | Herz ............ G06Q 30/02 709/217 |
| 6,618,593 B1 | 9/2003 | Drutman et al. |
| 6,731,940 B1 | 5/2004 | Nagendran |
| 6,751,669 B1 | 6/2004 | Ahuja et al. |
| 6,819,919 B1 | 11/2004 | Tanaka |
| 6,829,478 B1 | 12/2004 | Layton et al. |
| 6,834,195 B2 | 12/2004 | Brandenberg et al. |
| 6,848,542 B2 | 2/2005 | Gailey et al. |
| 6,915,271 B1 | 7/2005 | Meyer et al. |
| 6,934,684 B2 | 8/2005 | Alpdemir et al. |
| 6,944,447 B2 | 9/2005 | Portman et al. |
| 6,996,413 B2* | 2/2006 | Inselberg ............ H04H 20/38 455/517 |
| 7,027,801 B1 | 4/2006 | Hall et al. |
| 7,071,842 B1 | 7/2006 | Brady, Jr. |
| 7,110,971 B2 | 9/2006 | Wallman |
| 7,155,455 B2 | 12/2006 | Clendenin |
| 7,308,254 B1 | 12/2007 | Rissanen |
| 7,319,986 B2 | 1/2008 | Praisner et al. |
| 7,543,232 B2 | 6/2009 | Easton, Jr. et al. |
| 7,593,740 B2 | 9/2009 | Crowley et al. |
| 7,788,188 B2 | 8/2010 | Kramer |
| 7,856,360 B2 | 12/2010 | Kramer et al. |
| 8,027,861 B2 | 9/2011 | Brintle |
| 8,103,519 B2 | 1/2012 | Kramer et al. |
| 8,182,328 B2 | 5/2012 | Odom et al. |
| 8,300,556 B2 | 10/2012 | Kalipatnapu et al. |
| 8,577,346 B2 | 11/2013 | Dragt |
| 8,583,447 B2 | 11/2013 | Kramer et al. |
| 8,583,477 B2 | 11/2013 | Dodge et al. |
| 8,599,832 B2 | 12/2013 | Altberg et al. |
| 8,965,784 B2 | 2/2015 | Postrel |
| 2001/0014868 A1 | 8/2001 | Herz et al. |
| 2001/0042002 A1 | 11/2001 | Koopersmith |
| 2001/0042010 A1 | 11/2001 | Hassell |
| 2001/0043232 A1 | 11/2001 | Abbott et al. |
| 2001/0051973 A1 | 12/2001 | Green et al. |
| 2002/0010584 A1 | 1/2002 | Schultz et al. |
| 2002/0013815 A1 | 1/2002 | Obradovich |
| 2002/0016461 A1 | 2/2002 | Albers et al. |
| 2002/0022488 A1 | 2/2002 | Srinivasan et al. |
| 2002/0034292 A1 | 3/2002 | Tuoriniemi et al. |
| 2002/0047861 A1 | 4/2002 | Labrie et al. |
| 2002/0068585 A1 | 6/2002 | Chan et al. |
| 2002/0087525 A1 | 7/2002 | Abbott et al. |
| 2002/0095333 A1 | 7/2002 | Jokinen et al. |
| 2002/0111164 A1 | 8/2002 | Ritter |
| 2002/0116461 A1 | 8/2002 | Diacakis et al. |
| 2002/0120774 A1 | 8/2002 | Diacakis |
| 2002/0123934 A1 | 9/2002 | Tanaka et al. |
| 2002/0128903 A1* | 9/2002 | Kernahan ............ G06Q 30/02 705/14.22 |
| 2002/0138325 A1 | 9/2002 | Mashimo et al. |
| 2002/0151315 A1 | 10/2002 | Hendrey |
| 2002/0160766 A1 | 10/2002 | Portman et al. |
| 2002/0161657 A1 | 10/2002 | Kojac et al. |
| 2002/0174360 A1* | 11/2002 | Ikeda ............ G01C 21/26 726/7 |
| 2002/0184653 A1 | 12/2002 | Pierce et al. |
| 2003/0004802 A1 | 1/2003 | Callegari |
| 2003/0013438 A1* | 1/2003 | Darby ............ H04L 67/04 455/419 |
| 2003/0014275 A1 | 1/2003 | Bearden, III et al. |
| 2003/0060214 A1 | 3/2003 | Hendrey et al. |
| 2003/0073406 A1 | 4/2003 | Benjamin et al. |
| 2003/0100337 A1 | 5/2003 | Chotkowski et al. |
| 2003/0115288 A1 | 6/2003 | Ljubicich et al. |
| 2003/0117432 A1 | 6/2003 | Kautto-Kiovula et al. |
| 2003/0220835 A1 | 11/2003 | Barnes, Jr. |
| 2003/0233278 A1 | 12/2003 | Marshall |
| 2003/0233332 A1 | 12/2003 | Keeler et al. |
| 2004/0006478 A1 | 1/2004 | Alpdemir et al. |
| 2004/0006548 A1 | 1/2004 | Mahmood |
| 2004/0010608 A1 | 1/2004 | Piccionelli et al. |
| 2004/0015562 A1 | 1/2004 | Harper et al. |
| 2004/0024846 A1 | 2/2004 | Randall et al. |
| 2004/0081120 A1 | 4/2004 | Chaskar |
| 2004/0088551 A1 | 5/2004 | Dor |
| 2004/0093281 A1 | 5/2004 | Silverstein et al. |
| 2004/0107283 A1 | 6/2004 | Paddon |
| 2004/0111476 A1 | 6/2004 | Trossen et al. |
| 2004/0122810 A1 | 6/2004 | Mayer |
| 2004/0133480 A1 | 7/2004 | Domes |
| 2004/0137882 A1 | 7/2004 | Forsyth |
| 2004/0148638 A1 | 7/2004 | Weisman et al. |
| 2004/0151315 A1 | 8/2004 | Kim |
| 2004/0155903 A1 | 8/2004 | Schneeberg |
| 2004/0193489 A1 | 9/2004 | Boyd et al. |
| 2004/0203363 A1 | 10/2004 | Carlton et al. |
| 2004/0203746 A1 | 10/2004 | Knauerhase et al. |
| 2004/0215793 A1 | 10/2004 | Ryan et al. |
| 2004/0220922 A1 | 11/2004 | Lovison et al. |
| 2004/0224703 A1 | 11/2004 | Takaki et al. |
| 2004/0243478 A1 | 12/2004 | Walker et al. |
| 2004/0249712 A1* | 12/2004 | Brown ............ G06Q 30/0217 705/14.19 |
| 2004/0249846 A1 | 12/2004 | Randall et al. |
| 2004/0266457 A1 | 12/2004 | Dupray |
| 2004/0266480 A1 | 12/2004 | Hjelt et al. |
| 2005/0003759 A1 | 1/2005 | Alley |
| 2005/0038876 A1 | 2/2005 | Chaudhuri |
| 2005/0043060 A1 | 2/2005 | Brandenberg et al. |
| 2005/0054352 A1 | 3/2005 | Karaizman |
| 2005/0054439 A1 | 3/2005 | Rowe et al. |
| 2005/0076078 A1 | 4/2005 | Salton |
| 2005/0078088 A1 | 4/2005 | Davis et al. |
| 2005/0102180 A1 | 5/2005 | Gailey et al. |
| 2005/0130634 A1 | 6/2005 | Godfrey |
| 2005/0132305 A1 | 6/2005 | Guichard et al. |
| 2005/0135305 A1 | 6/2005 | Wentink |
| 2005/0136949 A1 | 6/2005 | Barnes, Jr. |
| 2005/0169446 A1 | 8/2005 | Randall et al. |
| 2005/0174975 A1 | 8/2005 | Mgrdechian et al. |
| 2005/0177385 A1 | 8/2005 | Hull et al. |
| 2005/0177614 A1 | 8/2005 | Bourne |
| 2005/0181803 A1 | 8/2005 | Weaver et al. |
| 2005/0193054 A1 | 9/2005 | Wilson et al. |
| 2005/0202817 A1 | 9/2005 | Sudit |
| 2005/0210387 A1 | 9/2005 | Alagappan et al. |
| 2005/0227676 A1 | 10/2005 | De Vries |
| 2005/0228719 A1* | 10/2005 | Roberts ............ G06Q 30/0267 705/14.58 |

(56) References Cited

U.S. PATENT DOCUMENTS

| | | |
|---|---|---|
| 2005/0251440 A1 | 11/2005 | Bednarek |
| 2006/0015404 A1 | 1/2006 | Tran |
| 2006/0020508 A1* | 1/2006 | Gorti .............. G06Q 30/02 705/14.23 |
| 2006/0022048 A1* | 2/2006 | Johnson ............ H04L 67/18 235/462.1 |
| 2006/0026067 A1 | 2/2006 | Nicholas et al. |
| 2006/0180664 A1 | 8/2006 | Barrett et al. |
| 2006/0195361 A1* | 8/2006 | Rosenberg ....... G06Q 30/0267 705/14.52 |
| 2006/0212355 A1* | 9/2006 | Teague ............. G06Q 30/02 705/14.16 |
| 2006/0217135 A1 | 9/2006 | Moore et al. |
| 2006/0230037 A1* | 10/2006 | Sugiyama ......... G06Q 10/109 |
| 2007/0030824 A1 | 2/2007 | Ribaudo et al. |
| 2007/0060109 A1* | 3/2007 | Ramer ............. H04M 15/745 455/414.1 |
| 2007/0061363 A1* | 3/2007 | Ramer ............. H04N 21/2668 |
| 2007/0071208 A1 | 3/2007 | Morris |
| 2007/0072591 A1 | 3/2007 | McGary et al. |
| 2007/0078965 A1 | 4/2007 | Shimamura et al. |
| 2007/0112762 A1 | 5/2007 | Brubaker |
| 2007/0118426 A1* | 5/2007 | Barnes, Jr. ........ G06Q 10/02 379/114.13 |
| 2007/0162328 A1* | 7/2007 | Reich .............. G06Q 30/0252 705/14.58 |
| 2007/0162337 A1 | 7/2007 | Hawkins et al. |
| 2007/0174259 A1* | 7/2007 | Amjadi .............. G06Q 30/02 |
| 2007/0179792 A1 | 8/2007 | Kramer |
| 2007/0216535 A1 | 9/2007 | Carrino et al. |
| 2007/0264968 A1* | 11/2007 | Frank .............. G06Q 30/02 455/404.2 |
| 2007/0270165 A1 | 11/2007 | Poosala |
| 2007/0281689 A1 | 12/2007 | Altman et al. |
| 2007/0282621 A1 | 12/2007 | Altman et al. |
| 2007/0287473 A1 | 12/2007 | Dupray |
| 2008/0033776 A1 | 2/2008 | Marchese |
| 2008/0040187 A1 | 2/2008 | Carraher et al. |
| 2008/0125965 A1 | 5/2008 | Carani et al. |
| 2008/0172274 A1* | 7/2008 | Hurowitz ........... H04L 67/322 455/433 |
| 2008/0242317 A1 | 10/2008 | Abhyanker |
| 2008/0248815 A1* | 10/2008 | Busch .............. G06Q 30/0261 455/456.5 |
| 2008/0255939 A1 | 10/2008 | Harmon et al. |
| 2008/0306826 A1 | 12/2008 | Kramer et al. |
| 2008/0319846 A1 | 12/2008 | Leming et al. |
| 2009/0024477 A1 | 1/2009 | Kramer et al. |
| 2009/0029721 A1 | 1/2009 | Doraswamy |
| 2009/0070230 A1 | 3/2009 | Silverstein et al. |
| 2009/0076911 A1 | 3/2009 | Vo et al. |
| 2009/0254930 A1 | 10/2009 | Lo et al. |
| 2009/0254971 A1 | 10/2009 | Herz et al. |
| 2010/0049702 A1 | 2/2010 | Martinez et al. |
| 2010/0331016 A1 | 12/2010 | Dutton et al. |
| 2011/0071895 A1 | 3/2011 | Masri |
| 2011/0093340 A1 | 4/2011 | Kramer et al. |
| 2011/0191152 A1 | 8/2011 | Schwartz |
| 2012/0089453 A1 | 4/2012 | Kramer et al. |
| 2012/0270563 A1 | 10/2012 | Sayed |
| 2013/0137464 A1 | 5/2013 | Kramer et al. |
| 2013/0282490 A1 | 10/2013 | Kramer et al. |
| 2013/0311291 A1 | 11/2013 | Ward et al. |
| 2014/0006129 A1 | 1/2014 | Heath |
| 2014/0207584 A1 | 7/2014 | Wicha |
| 2016/0048863 A1 | 2/2016 | Kramer et al. |

OTHER PUBLICATIONS

"Mobido website", www.mobido.com, Dec. 5, 2005, 10 pages.
"WaveMarket website", www. sixsense.com, Dec. 5, 2005, 11 pages.
6th Sense website, www.sixsense.com, 11 pages, (2004).
Kirk, "Mobile Phone Location Technology Fights Card Fraud," PC World, Business Center, 2 pages, (2009). [Retrieved from the Internet Jun. 19, 2009: <URL: http://www.pcworld.comibusinesscenter/article/165468/mobile_phone1>].
Marriott, "With GPS, getting around gets easier", C-Net, www.news.com/With+GPS%2C+getting+around+gets+easier/2100-1041_3-5998828.html, Dec. 18, 2005, 4 pages.
Vaugh-Nichols, "FAQ: How Google Latitude locates you," ComputerWorld, www.computerworld.com, 3 pages, (2009). [Retrieved from the Internet Jun. 19, 2009: <URL: http://www.computerworld.com/s/article/9127462/FAQ_How_Google_Latitude_locates_you_>].
WaveMarket website, www.wavemarket.com, 11 pages, (2004).
PCT International Search Report for application PCT/US2007/061328 dated Sep. 11, 2007.
Written Opinion for International Application No. PCT/US2007/061328 dated Sep. 11, 2007.
"U.S. Appl. No. 13/751,035 Office Action", dated May 6, 2014, 11 pages.
"U.S. Appl. No. 13/751,035 Final Office Action", dated Sep. 26, 2014, 19 pages.
Co-Pending U.S. Appl. No. 14/803,084, filed Jul. 20, 2015, 226 pages.
"U.S. Appl. No. 13/919,944 Office Action", dated May 12, 2016, 11 pages.
Complaint for Patent Infringement, United States District Court for the Northern District of Illinois Easter Division, Civil Action No. 1:16-cv-5064, *Groupon, Inc.*, Plaintiff v. *International Business Machines Corporation* (May 9, 2016) 14 pages; Exhibit A, 79 pages.
Motion to Dismiss Groupon's Complaint for Failure to State a Claim Upon Which Relief Can be Granted, United States District Court for the Northern District of Illinois Easter Division, Civil Action No. 1:16-ev-5064, *Groupon, Inc.*, Plaintiff v. *International Business Machines Corporation*, filed by Defendants (Aug. 15, 2016) 3 pages.
Defendant IBM's Memorandum in Support of Its Motion to Dismiss Groupon 's Complaint for Failure to State a Claim Upon Which Relief Can Be Granted, United States District Court for the Northern District of Illinois Easter Division, Civil Action No. 1:16-cv-5064, *Groupon, Inc.*, Plaintiff v. *International Business Machines Corporation*, filed by Defendants (Aug. 15, 2016) 20 pages.
Opposition of Plaintiff Groupon, Inc. to Motion to Dismiss, United States District Court for the Northern District of Illinois Easter Division, Civil Action No. 1:16-cv-5064, *Groupon, Inc.*, Plaintiff v. *International Business Machines Corporation.*, filed by Defendants (Sep. 8, 2016) 23 pages.
Defendant IBM's Reply Brief in Support of Its Motion to Dismiss Groupon's Complaint for Failure to State a Claim Upon Which Relief Can Be Granted, United States District Court for the Northern District of Illinois Easter Division, Civil Action No. 1:16cv-5064, *Groupon, Inc.*, Plaintiff v. *International Business Machines Corporation*, filed by Defendants (Sep. 13, 2016) 22 pages.
Defendant IBM's Answer to Plaintiff Groupon, Inc.'s Complaint for Patent Infringement, United States District Court for the Northern District of Illinois Eastern Division, Civil Action No. 1:16-cv-05064, *Groupon, Inc.*, Plaintiff v. *International Business Machines Corporation*, filed by Defendants (Jan. 18, 2017) 13 pages.
Defendant IBM's Opening Claim Construction Brief, United States District Court for the Northern District of Illinois Eastern Division, Civil Action No. 1:16-cv-05064, *Groupon, Inc.*, Plaintiff v. *International Business Machines Corporation*, filed by Defendants (Feb. 17, 2017) 30 pages.
Appendix to Defendant IBM's Opening Claim Construction Brief, United States District Court for the Northern District of Illinois Eastern Division, Civil Action No. 1:16-cv-05064, *Groupon, Inc.*, Plaintiff v. *International Business Machines Corporation*, filed by Defendants (Feb. 17, 2017) 11 pages.
Plaintiff Groupon, Inc.'s Responsive Claim Construction, United States District Court for the Northern District of Illinois Eastern Division, Civil Action No. 1:16-cv-05064, *Groupon, Inc.*, Plaintiff v. *International Business Machines Corporation*, filed by Defendants (Mar. 6, 2017) 31 pages.

(56) References Cited

OTHER PUBLICATIONS

Appendix to Plaintiff Groupon, Inc.'s Responsive Claim Construction, Part I, United States District Court for the Northern District of Illinois Eastern Division, Civil Action No. 1:16-cv-05064, *Groupon, Inc.*, Plaintiff v. *International Business Machines Corporation*, filed by Defendants (Mar. 6, 2017) 202 pages.

Appendix to Plaintiff Groupon, Inc.'s Responsive Claim Construction, Part II, United States District Court for the Northern District of Illinois Eastern Division, Civil Action No. 1:16-cv-05064, *Groupon, Inc.*, Plaintiff v. *International Business Machines Corporation*, filed by Defendants (Mar. 6, 2017) 183 pages.

Plaintiff Groupon, Inc.'s Declaration of Dr. Michael I. Shamos in Support of Responsive Claim Construction Brief of Groupon, Inc., United States District Court for the Northern District of Illinois Eastern Division, Civil Action No. 1:16-cv-05064, *Groupon, Inc.*, Plaintiff v. *International Business Machines Corporation*, filed by Defendants (Mar. 6, 2017) 27 pages.

Appendix to Plaintiff Groupon, Inc.'s Declaration of Dr. Michael I. Shamos in Support of Responsive Claim Construction Brief of Groupon, Inc., United States District Court for the Northern District of Illinois Eastern Division, Civil Action No. 1:16-cv-05064, *Groupon, Inc.*, Plaintiff v. *International Business Machines Corporation*, filed by Defendants (Mar. 6, 2017) 50 pages.

Defendant IBM's Reply Claim Construction Brief, United States District Court for the Northern District of Illinois Eastern Division, Civil Action No. 1:16-cv-05064, *Groupon, Inc.*, Plaintiff v. *International Business Machines Corporation*, filed by Defendants (Mar. 13, 2017) 21 pages.

Petitioner IBM's Petition for Inter Partes Review, IPR2017-01452, dated May 18, 2017, 90 pages.

Petitioner IBM's Petition for Inter Partes Review, IPR2017-01452, dated May 18, 2017, 88 pages.

Claim Construction Hearing Before the Honorable Rebecca Pallmeyer (Transcript), United States District Court for the Northern District of Illinois Eastern Division, Civil Action No. 1:16-cv-05064, *Groupon, Inc.*, Plaintiff v. *International Business Machines Corporation*, filed by Defendants (Jun. 7, 2017) 93 pages.

Patent Owner's Preliminaty Response, *International Business Machines Corp.* Petitioner v. *Groupon, Inc.* Patent Owner, Case IPR2017-01451, U.S. Pat. No. 7,856,360 B2 (dated Sep. 6, 2017) 63 pages.

Patent Owner's Preliminary Response, *International Business Machines Corp.* Petitioner v. *Groupon, Inc.* Patent Owner, Case IPR2017-01452, U.S. Pat. No. 7,856,360 B2 (dated Sep. 6, 2017) 75 pages.

Decision, Denying Institution of inter Partes Review 37 C.R.F. § 42.108, Case IPR2017-01452, *International Business Machines Corp.* v. *Groupon, Inc.*, Patent Trial and Appeal Board, Dec. 5, 2017, 29 pages.

Decision, Institution of Inter Partes Review 37 C.R.F. § 42.108, Case IRP2017-01451, *International Business Machines Corp.* v. *Groupon, Inc.*, Patent Trial and Appeal Board, Dec. 5, 2017, 33 pages.

Patent Owner's Response, *International Business Machines Corp.* Petitioner v. *Groupon, Inc.* Patent Owner, Case IPR2017-01451, U.S. Pat. No. 7,856,360 B2 (dated Mar. 22, 2018) 68 pages.

Exhibit 2008 of Patent Owner's Response—Transcript of Susan Spielman's Testimony, *International Business Machines Corp.* Petitioner v. *Groupon, Inc.* Patent Owner, Case IPR2017-01451, U.S. Pat. No. 7,856,360 B2 (dated Feb. 21, 2018) 355 pages.

Declaration of Sigurd Meldal, Dr. Sc., *International Business Machines Corp.* Petitioner v. *Groupon, Inc.* Patent Owner, Case IPR2017-01451, U.S. Pat. No. 7,856,360 B2 (dated Mar. 22, 2018) 121 pages.

Supplemental Patent Owner's Response, IPR2017-01451, dated May 31, 2018, 11 pages.

Exhibit 2009 to Supplemental Patent Owner's Response—Supplemental Declaration of Sigurd Meldal, Dr. Sc.., *International Business Machines Corp.* Petitioner v. *Groupon, Inc.* Patent Owner, Case IPR2017-01451, U.S. Pat. No. 7,856,360 B2 (dated May 31, 2018) 18 pages.

International Business Machines Corporation's Reply in Support of its Petition, Case IPR2017-01451, U.S. Pat. No. 7,856,360 dated Jul. 2, 2018 (30 pages of Reply) and including Exhibits Nos. 1021, 1022, 1023, 1024, and 1025.

Response to Final Invalidity Contentions of Plaintiff Groupon, Inc. in *Groupon, Inc.* v. *Int'l Bus. Machs. Corp.*, Civil Action No. 1:16-cv-5064 (N.D. III) (May 17, 2017) (Exhibit 1021) 215 pages.

Deposition Transcript of Sigurd Meldal, Dr. Sc. (Jun. 13, 2018) (cited as "Meldal Dep. Tr."). (Exhibit 1022) 289 pages.

Complaint in *Groupon, Inc.* v. *Int'l Bus. Machs. Corp.*, Civil Action No. 1:16-cv-5064 (May 9, 2016) (Exhibit 1023) 93 pages.

Transcript of Claim Construction Hearing in *Groupon, Inc.* v. *Int'l Bus. Machs. Corp.*, Civil Action No. 1:16-cv-5064 (N.D. III.) (Apr. 3, 2017). (Exhibit 1024) 93 pages.

Applicant's Opposition to the Motion to Dismiss in *Groupon, Inc.* v. *Int'l Bus. Machs. Corp.*, Civil Action No. 1:16-cv-5064 (N.D. III.) (Sep. 8, 2016). (Exhibit 1025) 23 pages.

IBM's 1451 Demonstrative Exhibits for Sep. 5, 2018 Oral Hearing, in Case IRP2017-01451 (Sep. 4, 2018) (49 pages).

Patent Owner's Demonstratives Under 42.70b for Sep. 5, 2018 Oral Hearing, in Case IRP2017-01451 (Sep. 4, 2018) (63 pages).

Record of Oral Hearing, which was held on Sep. 5, 2018, in in Case IRP2017-01451 (Sep. 5, 2018) (76 pages).

\* cited by examiner

SYSTEM FOR MARKETING CAMPAIGN SPECIFICATION AND SECURE DIGITAL COUPON REDEMPTION

CROSS REFERENCE TO RELATED APPLICATIONS

This application is a continuation of U.S. application Ser. No. 14/052,542 filed Oct. 11, 2013, which is a continuation of U.S. patent application Ser. No. 13/329,307, filed Dec. 18, 2011, which is a continuation to U.S. patent application Ser. No. 12/182,592, filed eft Jul. 18, 2008 now U.S. Pat. No. 8,103,519), which is a continuation-in-part of U.S. patent application Ser. No. 12/161,554, filed Jul. 18, 2008 (now U.S. Pat. No. 7,856,360), and which patent application Ser. No. 12/161,554 is a U.S. the National Stage of International Application No. PCT/US2007/061328, filed Jan. 30, 2007, which is a continuation-in-part of U.S. patent application Ser. No. 11/307,262, filed Jan. 30, 2006 0 now U.S. Pat. No. 7,788,188, and which International Application No. PCT/US2007/061328 claims the benefit of U.S. Provisional Application No. 60/823,573, filed Aug. 25, 2006, each of which are incorporated herein by reference in their entirety.

TECHNICAL FIELD

The field of this invention is digital coupons.

BACKGROUND

Historically coupons came in the form of paper documents, often being combined with daily or weekly newspapers or monthly magazines. With the advent of the internet and digital media, we can now have paperless, digital coupons. Such digital coupons bring many potential advantages including flexibility in scheduling, when to send out time-sensitive digital coupons, low cost and ease of digital coupon dissemination. Digital coupons can even be sent to a mobile phone. This new digital media creates a need to specify in a manageable way when digital coupons should be sent out. Digital coupons also introduce added security risks requiring novel approaches.

SUMMARY OF THE INVENTION

An interface is presented whereby a product vendor can specify timing aspects regarding a promotional instrument for its products, such as a digital coupon. Employing the subject invention, the timing aspects of such an instrument that a vendor can specify typically include such things as the start date, start time, end time and when to send out the instrument to prospective product consumers. Importantly, the vendor can also specify a recurrence timing aspect for an instrument that includes a recurrence pattern, a recurrence range for when to end the recurrence and how to send out the recurring instrument.

The integrity of instruments on mobile phones is protected by employing a coding system. The subject invention coding system comprises reference numbers and sequence numbers. Presentation of the instrument to a recipient product vendor follows a protocol, including evaluation of the instrument to determine validity followed by redemption of a valid instrument.

BRIEF DESCRIPTION OF THE DRAWINGS

FIG. 2A is a non-redeemed digital coupon and FIG. 2B is a redeemed digital coupon.

DETAILED DESCRIPTION OF THE INVENTION

Figure 1:
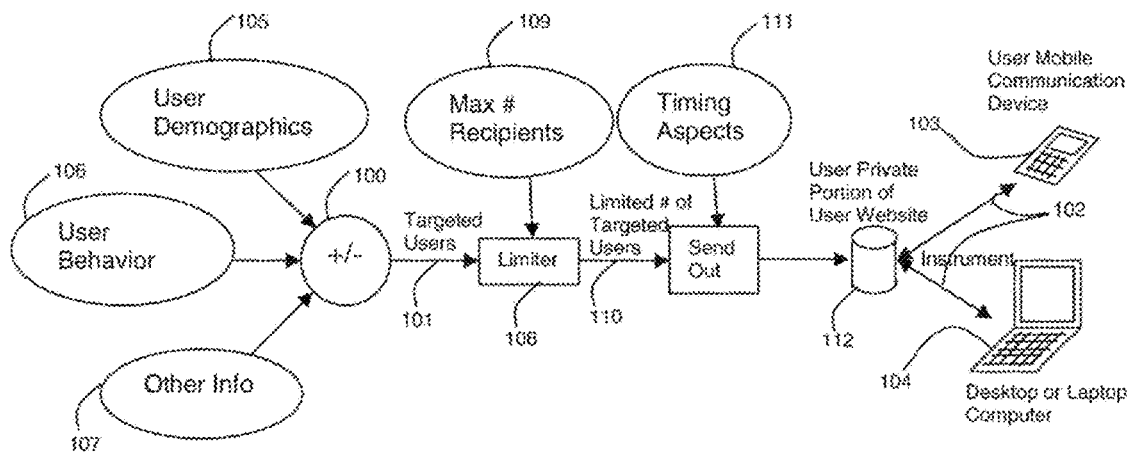
FIG. 1 is a block diagram providing how recipients are selected and limited to a desired number, and how selected recipients view instruments using a mobile communication device and/or desktop or laptop computer.

In accordance with the subject invention, product vendors are provided with a system for performing a marketing campaign to mobile communication device users, providing offers as instruments, such as digital coupons, to a selected group of users of the mobile communication devices and validating the integrity of the instruments. The invention has two phases: the selection of the components of the instrument from a menu provided by a social networking organization; and validating the instrument upon redemption from the product vendor. The social networking organization maintains a data base managed by a data processor, e.g., computer server. In the first phase, the product vendor selects elements from the menu relevant to the campaign, such as timing, nature of the offer, restrictions to the offer, targeting of the recipients, etc. In the second phase, the instrument is encoded as to the marketing campaign and an arbitrary designation which initiates a pattern as the instrument is redeemed. The product vendor inspects the instrument to ensure that the encoding is correct before and after redeeming the instrument.

In the first phase, the product vendor, who also serves as the award provider, is provided a menu from the social networking organization for defining the nature of the marketing campaign. The social networking organization has members and has the data base on the computer server with member demographics, behavior and use of product vendors. Instruments are provided to the members by way of an offer from the product vendor. The menu contains an extensive list of components to be selected by the product vendor in launching the marketing campaign. The elements from the menu include the timing of the offer, the subject matter of the offer, and the characteristics of the members to receive the instrument.

The timing aspects typically include the start date, start time, end time and when to make the instrument available to recipients. The timing aspects may also include recurrence information, such as a recurrence pattern, when to end the recurrence and when to make the recurring instrument available to recipients. Being able to specify timing aspects of an instrument is very valuable. In particular, it allows a vendor to send out instruments or to have them be valid during a known time of the day when business is slow. A vendor may even send out instruments immediately when the vendor sees that business is slow at any given time in order to smooth out business traffic. An instrument such as a digital coupon has clear advantages over the lack of flexibility of timing aspects of other marketing media such as newspapers, radio, TV, and the like.

The instrument includes the type of offer being made and what item or items it covers. It can also include the time in which redemption of the instrument can be made.

The instrument may be presented as a digital coupon for redemption of an award. Details of the instrument are indicated on the display of a mobile communication device. For example, the computer server may generate the instrument as a text message or email sent to a mobile phone, or send the instrument as a web page to be rendered on a mobile phone. The user of the mobile phone may then show the instrument to a vendor who provides the award to the user.

A mobile communication device includes, but is not limited to, a mobile phone, a mobile computer, a pager or any other wireless device capable of receiving an instrument signal and interacting with the user, such as a product consumer or social networking organization member, in order to redeem the instrument.

FIG. 1 is a block diagram showing selection 100 of targeted users 101 to receive an instrument 102 and how such users access the instrument using a variety of devices 103 and 104. To select targeted users 101 a vendor may select from a variety of user demographics 105 and user behavior 106, and may further select based on other information 107. User demographics 105 may include, but is not limited to, gender, age, residence distance from the vendor, whether the user has indicated that the vendor is a favorite, user interests, whether the user is a student, user sexual orientation and user income level. User behavior 106 may include, but is not limited to, whether the user has visited the vendor and when, whether the user has visited another vendor and when, whether the user has an alert set to notify them if they receive an instrument from the vendor, whether the user has done a recent search that ranks the vendor, user drinking frequency and whether the user might be interested in a singles night. Other information 107 the vendor may use to select targeted user includes, but is not limited to, a customized list of users, and the popularity or social status of users as determined by other users.

The vendor may then limit 108 the resulting list of targeted users by selecting a maximum number of users 109. A limited list of targeted users 110 is then created from the non-limited list of targeted users 101. To create the limited list of targeted users 110, typically targeted users are selected at random from the non-limited list of targeted users 101 until the maximum number of users 109 is reached.

The vendor then specifies the timing aspects 111 of the instrument 102. Such specification may include, but is not limited to start date, start time, end time and whether to send out the offer now or a specified amount of time before the start time. The vendor may also specify that the instrument recurs.

If recurrence is specified, the vendor typically must further select the recurrence pattern, range and how to send out the instrument, such as one per recurring day, one per recurring week or only once covering all recurring days. Typically the recurrence pattern may be daily, weekly, monthly or yearly. If daily is selected, typically the vendor may select a pattern of every so many days or every weekday. If weekly is selected, typically the vendor may select a pattern of every so many weeks or may specifically select which days of the week are to be included in the pattern. If monthly is selected, typically the vendor may select which days of which months are to be included in the pattern. If yearly is selected, typically the vendor may select which days of which months are to be included in the pattern.

The range timing aspect typically allows the vendor to specify that the instrument recurrence has no end date, ends after a set number of patterns or ends after a set date.

Typically the vendor can specify how to send out the instrument by selecting whether to send out one instrument per recurring day or to send out one instrument covering all recurring days.

Sending out the instrument typically includes making the instrument available to each of the limited targeted users 110 by allowing each to view the instrument on their own private portion of the user website 112. The private portion may take the form of a private account on the computer server. Viewing of the instrument is typically achieved using a user mobile communication device 103 or desktop or laptop computer 104.

The vendor will also define the nature of the offer, namely the type and item, such as two drinks for the price of one, free admission or no service charge where there are normally charges, 10% discount on beer and/or wine, etc.

Once the mobile-communication-device user has received the instrument, they may then proceed to redeem the instrument in accordance with its terms. The instrument is then presented to the product vendor/award provider for redemption. A system and method is provided for the award provider to ensure the integrity of the instrument. The method employs the computer server which provides two separate websites, one for award providers (the award-provider website) and one for users of mobile communication devices (the user website) who are prospective recipients of instruments. Each award provider has its own private portion of the award provider website; each user has its own private portion of the user website.

The following validation system that is described finds use not only with the marketing campaign described above, but also with other digital coupon redemptions.

When the mobile-communication-device user presents the mobile communication device showing the instrument to the award provider, the award provider checks the instrument for its validity. The instrument is coded to prevent counterfeiting, such as unauthorized creation of an instrument by other than the award provider, or recreating or copying a valid instrument. The instrument code also prevents unlicensed repetitive use of a valid instrument.

Besides the components described above, an instrument typically includes a description of the award, the name of the award provider, the period that the award is valid, the current time, a reference designator and a sequence designator. Typically the reference and sequence designators don't appear on an unredeemed instrument; they appear on a redeemed instrument and are viewable on the award-provider website. The reference designator represents a family of instruments, such as instruments associated with a marketing campaign of the award provider. The reference designator will typically have from 3 to 8 symbols, conveniently 5 symbols, which are typically 5 numbers. For a specific family of instruments the reference designator is typically chosen at random from a range of reference designators. A random reference designator is typically chosen for each family, although over extended periods of time the reference designator may be repeated.

Redemption involves displaying the instrument to the award provider and then requesting redemption using the mobile communication device. Typically, the reference and sequence designators will then be indicated and associated with the instrument along with the time of redemption and the time since redemption. As indicated above, when redeemed, the reference and sequence designators appear on the display of the mobile communication device comprising the instrument. Also, some indication of the fact of redemption will usually appear, e.g., the term "redeemed."

When the instrument is redeemed, it is assigned a unique sequence designator, which typically appears on the display comprising the redeemed instrument. The initial sequence designator for a given reference designator is chosen at random from a range of sequence designators. After the first redemption, each sequence designator for other redeemed instruments associated with the same reference designator is incremented in accordance with a predetermined pattern.

The award provider inspects the unredeemed instrument and upon redemption confirms the validity of the instrument. Confirmation may include:

1. assuring that the display appears valid;
2. confirming that the redemption time and time since redemption are reasonable;
3. confirming that the reference designator is valid;
4. checking whether the sequence designator appears proper for the given reference designator, e.g.,
   a. the sequence designator is in the correct range;
   b. the sequence designator tracks with a previous sequence designator, particularly the immediately previous sequence designator;
5. having the mobile-communication-device user communicate with the user website and request redisplay of the redeemed instrument;
6. checking the award-provider website to confirm it shows the same reference designator, sequence designator, time of redemption and time since redemption; and
7. having the mobile-communication-device user communicate with the user website to request that the user website communicate instrument and other information to the award provider including: the reference designator, the sequence designator, time of redemption, time since redemption and optionally identifying information concerning the identity of the mobile-communication-device user.

Figures 2A, 2B:
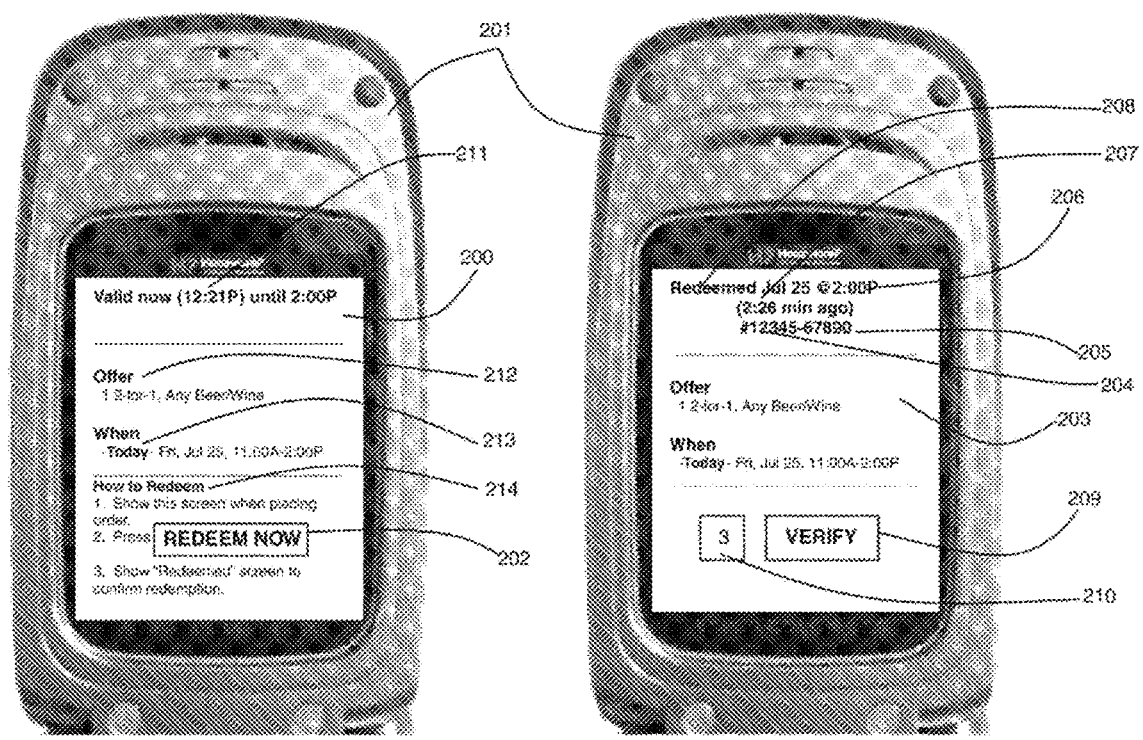
FIGS. 2A and 2B provide exemplary displays of an instrument such as a digital coupon.

For further understanding of the invention a useful embodiment is provided in FIGS. 2A and 2B showing exemplary displays on a mobile communication device of an unredeemed instrument and a redeemed instrument, respectively. The instrument shown is a digital coupon displayed on a mobile phone. See also PCT application no. PCT/US07/61328.

The embodiment involves a vendor such as a venue (i.e., the award provider), such as a bar, nightclub or lounge, that is associated with a social networking organization comprising members (i.e., users) who use mobile phones (i.e., mobile communication devices) and who attend venues. The social networking organization has a computer server. The venue defines a marketing campaign on the social networking organization computer server to offer a drink discount to selected members (see also targeted users 101 in FIG. 1) of the social networking organization. The social networking organization computer server then transmits a digital coupon (i.e., the instrument), typically by sending web-page instructions, a text message or email to the mobile phones (see also user mobile communication device 103 of FIG. 1) of the selected members of the social networking organization offering such members the drink discount at the venue.

To redeem the drink discount, the member goes to the venue and shows the unredeemed digital coupon 200 on their mobile phone 201 to a venue bartender. The unredeemed digital coupon 200 may display a 5-digit reference number (i.e., the reference designator) corresponding to the marketing campaign, but typically, the 5-digit reference number is only displayed on a redeemed digital coupon. The unredeemed digital coupon 200 also displays the period that the award is valid and the current time 211. The unredeemed digital coupon 200 (as well as the redeemed digital coupon) also shows the nature of the offer, such as the offer type 212 and offer item 213. The unredeemed digital coupon 200 typically also provides the protocol 214 for redeeming the coupon, such as the steps: (1) Show this screen when placing order, (2) Press "REDEEM NOW," and (3) Show "Redeemed" screen to confirm redemption.

After the member shows the unredeemed digital coupon 200 on their mobile phone 201 to the venue bartender, the venue bartender inspects the unredeemed digital coupon 200 to make sure it looks authentic. If a reference number is displayed on the unredeemed digital coupon 200, the venue bartender checks that the reference number is the correct number for the venue's marketing campaign. The member then selects the redemption link 202 associated with the digital coupon.

A redeemed digital coupon 203 is then displayed in place of the unredeemed digital coupon 200, and the redeemed digital coupon 203 then displays the 5-digit reference number 204 as well as a 5-digit sequence number (i.e., the sequence designator) 205, the redemption time 206, time since redemption 207 and an indicator of redemption, e.g. the word "Redeemed" 208. The sequence number will start from a random seed and then be incremented by one each time a digital coupon for the same marketing campaign is redeemed.

Before the drink discount is applied to the drink order, the venue bartender checks the digital coupon by looking at the member's mobile phone to see that it indicates that the digital coupon has been redeemed and now displays the other information, such as time of redemption 206, time since redemption 207, reference number 204 and a sequence number 205 that has been incremented by one since the last digital coupon was redeemed. The member website (i.e., the user website) provides a web page to members where digital coupons are listed, both redeemed and unredeemed. The venue bartender may ask the member to use the member's mobile phone to go to such web page and select the digital coupon presented to the venue bartender to compare it with the previously displayed digital coupon.

If the venue bartender desires further confirmation that the tendered digital coupon is authentic and valid, the venue bartender may access the venue website (i.e., award provider website) that records all digital coupons redeemed at the venue. The venue bartender may compare the details of the redeemed digital coupon displayed on the venue's private portion of the computer server, including the 5-digit reference number 204, the 5-digit sequence number 205, redemption time 206 and time since redemption 207, to verify the details match the details displayed on the member's mobile phone.

The venue bartender may still further confirm the validity of a redeemed digital coupon 203 by instructing the redeeming member to select the "Verify" link 209 associated with the redeemed digital coupon, and enter the venue bartender's validation extension number 210. The mapping between the validation extension number and venue bartender's mobile phone number is specified on the venue website, and thus it is not known to others who might potentially try to create an unauthorized or counterfeit digital coupon. Selecting the Verify link 209 followed by the validation extension number 210 typically causes the social networking organization computer server to send a text message containing the redemption details to the venue bartender's mobile phone. In addition to, or in place of, sending a text message, the social networking organization computer server may send a message containing redemption details via an email, a fax or make an automated voice call. Such redemption verification details typically include details of the digital coupon offer, the reference number 204, the sequence number 205, the time of redemption 206, the time since redemption 207 and optionally identifying information concerning the redeeming member. Such optional identifying information may include, but is not limited to, demographic information such as age, gender, hair color, eye color, height, picture and name.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. An apparatus for providing a service to a third-party system or a third-party apparatus, the service configured for identifying mobile devices utilized by particular categories of consumers and transmitting electronic messages to the mobile devices, the apparatus comprising at least one processor and at least one memory including computer program code, the at least one memory and the computer program code configured to, with the processor, cause the apparatus to at least:
   provide a graphical user interface (GUI) configured for receiving category input and at least one restriction from the third-party system or the third-party apparatus, the category input defining (1) a particular category of user profiles to which to direct an electronic message, and (2a) one or more characteristics and (2b) associated criteria of each of the one or more characteristics required for classification to the particular category of user profiles, the at least one restriction comprising a maximum number of user profiles in the particular category of user profiles;
   receive the category input from the third-party system or the third-party apparatus, the category input defining the particular category of user profiles to which to direct the electronic message, and the one or more characteristics and the associated criteria of each of the one or more characteristics required for classification to the particular category of user profiles;
   receive the at least one restriction from the third-party system or the third-party apparatus;
   receive a plurality of Global Positioning System (GPS) device locations from at least one mobile communication device;
   compare the plurality of GPS device locations to a known fixed position to determine an assumed location of the at least one mobile communication device;
   identify a user profile associated with the at least one mobile communications device, the user profile comprising user trait data and user activity history data;
   determine that the assumed location of the at least one mobile communication device meets a pre-defined condition;
   determine that the user profile associated with the at least one mobile communication device is classified to the particular category of user profiles, wherein the determination comprises determining, via at least one or more classification techniques including bayesian decision theory, vector quantizers, and neural network algorithms, that each of the one or more characteristics accessed from user trait data of the user profile associated with the at least one mobile communication device meets the associated criteria defined by the category input as required for classification to the particular category of user profiles; and
   upon determination that the user profile associated with the at least one mobile communication device is classified to the particular category of user profiles, cause transmission of the electronic message.

2. The apparatus of claim 1, wherein the electronic message is indicative of a particular offer.

3. The apparatus of claim 2, wherein the at least one memory and the computer program code are further configured to, with the processor, cause the apparatus to:
   receive, via the GUI, a set of category inputs identifying a particular series of location-based categories to which a consumer must belong to in a defined sequence that, upon being completed, results in the transmission of the electronic message indicative of the particular offer,
   a first location based category being 'not present' at a specific location, a second location based category being 'present' at the specific location, and the defined sequence being the first location based category and subsequently, the second location based category;
   determine, subsequent to the reception of the set of category inputs, one or more mobile devices belonging to the first location based category, including the at least one mobile communication device;
   cause transmission of promotional material informative of the particular offer to the one or more mobile devices, including the at least one mobile communication device;
   store to a data registry the plurality of GPS device locations;
   subsequent to the comparison of the plurality of GPS device locations to the known fixed position to determine the assumed location of the at least one mobile communication device, determine that the assumed location of at least one mobile communication device meets a pre-defined condition for classification to the second location based category; and
   upon determination that the at least one mobile communication device is classified to the second location based category, cause transmission of the electronic message indicative of the particular offer.

4. The apparatus of claim 1, wherein the at least one memory and the computer program code are further configured to, with the processor, cause the apparatus to:
   identify a reciprocal category of second user profiles based on the particular category upon classifying the user profile to the particular category,
   wherein the second user profiles are respectively associated with a plurality of second mobile communication devices, and
   wherein the plurality of second mobile communication devices do not include the at least one mobile communication device; and
   cause transmission of the electronic message to the plurality of second mobile communication devices.

5. The apparatus of claim 1, wherein the at least one memory and the computer program code are further configured to, with the processor, cause the apparatus to:
   compare a system time to a user-defined reporting period; and
   only in a circumstance where the system time satisfies the user-defined reporting period, compare the plurality of GPS device locations to the known fixed position to determine the assumed location of the at least one mobile communication device.

6. The apparatus of claim 1, wherein the at least one memory and the computer program code are further configured to, with the processor, cause the apparatus to:
- receive, via the GUI, a third-party specified recurrence pattern; and
- cause transmission of the electronic message in accordance with the third-party specified recurrence pattern.

7. A computer program product for providing a service to a third-party system or a third-party apparatus, the service configured for identifying mobile devices utilized by particular categories of consumers and transmitting electronic messages to the mobile devices, the computer program product comprising at least one non-transitory computer-readable storage medium having computer-executable program code instructions stored therein, the computer-executable program code instructions comprising program code instructions to:
- provide a graphical user interface (GUI) configured for receiving category input and at least one restriction from the third-party system or the third-party apparatus, the category input defining (1) a particular category of user profiles to which to direct an electronic message, and (2a) one or more characteristics and (2b) associated criteria of each of the one or more characteristics required for classification to the particular category of user profiles, the at least one restriction comprising a maximum number of user profiles in the particular category of user profiles;
- receive the category input from the third-party system or the third-party apparatus, the category input defining the particular category of user profiles to which to direct the electronic message, and the one or more characteristics and the associated criteria of each of the one or more characteristics required for classification to the particular category of user profiles;
- receive the at least one restriction from the third-party system or the third-party apparatus;
- receive a plurality of Global Positioning System (GPS) device locations from at least one mobile communication device;
- compare the plurality of GPS device locations to a known fixed position to determine an assumed location of the at least one mobile communication device;
- identify a user profile associated with the at least one mobile communications device, the user profile comprising user trait data and user activity history data;
- determine that the assumed location of the at least one mobile communication device meets a pre-defined condition;
- determine that the user profile associated with the at least one mobile communication device is classified to the particular category of user profiles, wherein the determination comprises determining, via at least one or more classification techniques including bayesian decision theory, vector quantizers, and neural network algorithms, that each of the one or more characteristics accessed from user trait data of the user profile associated with the at least one mobile communication device meets the associated criteria defined by the category input as required for classification to the particular category of user profiles; and
- upon determination that the user profile associated with the at least one mobile communication device is classified to the particular category of user profiles, cause transmission of the electronic message.

8. The computer program product of claim 7, wherein the electronic message is indicative of a particular offer.

9. The computer program product of claim 8, wherein the computer-executable program code instructions further comprise program code instructions to:
- receive, via the GUI, a set of category inputs identifying a particular series of location-based categories to which a consumer must belong to in a defined sequence that, upon being completed, results in the transmission of the electronic message indicative of the particular offer,
- a first location based category being 'not present' at a specific location, a second location based category being 'present' at the specific location, and the defined sequence being the first location based category and subsequently, the second location based category;
- determine, subsequent to the reception of the set of category inputs, one or more mobile devices belonging to the first location based category, including the at least one mobile communication device;
- cause transmission of promotional material informative of the particular offer to the one or more mobile devices, including the at least one mobile communication device;
- store to a data registry the plurality of GPS device locations;
- subsequent to the comparison of the plurality of GPS device locations to the known fixed position to determine the assumed location of the at least one mobile communication device, determine that the assumed location of at least one mobile communication device meets a pre-defined condition for classification to the second location based category; and
- upon determination that the at least one mobile communication device is classified to the second location based category, cause transmission of the electronic message indicative of the particular offer.

10. The computer program product of claim 7, wherein the computer-executable program code instructions further comprise program code instructions to:
- identify a reciprocal category of second user profiles based on the particular category upon classifying the user profile to the particular category,
- wherein the second user profiles are respectively associated with a plurality of second mobile communication devices, and
- wherein the plurality of second mobile communication devices do not include the at least one mobile communication device; and
- cause transmission of the electronic message to the plurality of second mobile communication devices.

11. The computer program product of claim 7, wherein the computer-executable program code instructions further comprise program code instructions to:
- compare a system time to a user-defined reporting period; and
- only in a circumstance where the system time satisfies the user-defined reporting period, compare the plurality of GPS device locations to the known fixed position to determine the assumed location of the at least one mobile communication device.

12. The computer program product of claim 7, wherein the computer-executable program code instructions further comprise program code instructions to:
- receive, via the GUI, a third-party specified recurrence pattern; and
- cause transmission of the electronic message in accordance with the third-party specified recurrence pattern.

13. A computer-implemented method for providing a service to a third-party system or a third-party apparatus, the service configured for identifying mobile devices utilized by particular categories of consumers and transmitting electronic messages to the mobile devices, the computer program product comprising at least one non-transitory computer-readable storage medium having computer-executable program code instructions stored therein, the computer-implemented method comprising:

provuiding a graphical user interface (GUI) configured for receiving category input and at least one restriction from the third-party system or the third-party apparatus, the category input defining (1) a particular category of user profiles to which to direct an electronic message, and (2a) one or more characteristics and (2b) associated criteria of each of the one or more characteristics required for classification to the particular category of user profiles, the at least one restriction comprising a maximum number of user profiles in the particular category of user profiles;

receiving the category input from the third-party system or the third-party apparatus, the category input defining the particular category of user profiles to which to direct the electronic message, and the one or more characteristics and the associated criteria of each of the one or more characteristics required for classification to the particular category of user profiles;

receiving the at least one restriction from the third-party system or the third-party apparatus;

receiving a plurality of Global Positioning System (GPS) device locations from at least one mobile communication device;

comparing the plurality of GPS device locations to a known fixed position to determine an assumed location of the at least one mobile communication device;

identifying a user profile associated with the at least one mobile communications device, the user profile comprising user trait data and user activity history data;

determining that the assumed location of the at least one mobile communication device meets a pre-defined condition;

determining that the user profile associated with the at least one mobile communication device is classified to the particular category of user profiles, wherein the determination comprises determining, via at least one or more classification techniques including bayesian decision theory, vector quantizers, and neural network algorithms, that each of the one or more characteristics accessed from user trait data of the user profile associated with the at least one mobile communication device meets the associated criteria defined by the category input as required for classification to the particular category of user profiles; and upon determination that the user profile associated with the at least one mobile communication device is classified to the particular category of user profiles, causing transmission of the electronic message.

14. The computer-implemented method of claim 13, wherein the electronic message is indicative of a particular offer.

15. The computer-implemented method of claim 14, wherein the computer-implemented method further comprises:

receiving, via the GUI, a set of category inputs identifying a particular series of location-based categories to which a consumer must belong to in a defined sequence that, upon being completed, results in the transmission of the electronic message indicative of the particular offer, a first location based category being 'not present' at a specific location, a second location based category being 'present' at the specific location, and the defined sequence being the first location based category and subsequently, the second location based category;

determining, subsequent to the reception of the set of category inputs, one or more mobile devices belonging to the first location based category, including the at least one mobile communication device;

causing transmission of promotional material informative of the particular offer to the one or more mobile devices, including the at least one mobile communication device;

storing to a data registry the plurality of GPS device locations;

subsequent to the comparison of the plurality of GPS device locations to the known fixed position to determine the assumed location of the at least one mobile communication device, determining that the assumed location of the at least one mobile communication device meets a pre-defined condition for classification to the second location based category; and upon determination that the at least one mobile communication device is classified to the second location based category, causing transmission of the electronic message indicative of the particular offer.

16. The computer-implemented method of claim 13, wherein the computer-implemented method further comprises:

identifying a reciprocal category of second user profiles based on the particular category upon classifying the user profile to the particular category, wherein the second user profiles are respectively associated with a plurality of second mobile communication devices, and wherein the plurality of second mobile communication devices do not include the at least one mobile communication device; and causing transmission of the electronic message to the plurality of second mobile communication devices.

17. The computer-implemented method of claim 13, wherein the computer-implemented method further comprises:

comparing a system time to a user-defined reporting period; and only in a circumstance where the system time satisfies the user-defined reporting period, comparing the plurality of GPS device locations to the known fixed position to determine the assumed location of the at least one mobile communication device.

18. The computer-implemented method of claim 13, wherein the computer-implemented method further comprises:

receiving, via the GUI, a third-party specified recurrence pattern; and causing transmission of the electronic message in accordance with the third-party specified recurrence pattern.

\* \* \* \* \*

UNITED STATES PATENT AND TRADEMARK OFFICE
CERTIFICATE OF CORRECTION

PATENT NO. : 11,138,626 B2
APPLICATION NO. : 16/151503
DATED : October 5, 2021
INVENTOR(S) : Kramer et al.

It is certified that error appears in the above-identified patent and that said Letters Patent is hereby corrected as shown below:

In the Claims

Column 8,
Line 37, in Claim 3, "of at least one mobile communication device" should read --of the at least one mobile communication device--.

Column 10,
Line 28, in Claim 9, "of at least one mobile communication device" should read --of the at least one mobile communication device--.

Signed and Sealed this
Twenty-fifth Day of October, 2022

*Katherine Kelly Vidal*

Katherine Kelly Vidal
*Director of the United States Patent and Trademark Office*